(12) United States Patent
DeBoth

(10) Patent No.: US 9,243,700 B1
(45) Date of Patent: Jan. 26, 2016

(54) COUPLED WORM PLANETARY GEAR CONTINUOUSLY VARIABLE RATIO TRANSMISSION

(71) Applicant: Robert Harold DeBoth, New Holstein, WI (US)

(72) Inventor: Robert Harold DeBoth, New Holstein, WI (US)

( * ) Notice: Subject to any disclaimer, the term of this patent is extended or adjusted under 35 U.S.C. 154(b) by 0 days.

(21) Appl. No.: 14/814,869

(22) Filed: Jul. 31, 2015

Related U.S. Application Data

(60) Provisional application No. 62/125,263, filed on Jan. 20, 2015.

(51) Int. Cl.
  *F16H 3/06* (2006.01)
  *F16H 37/06* (2006.01)
  *F16H 3/72* (2006.01)
  *F16H 1/28* (2006.01)

(52) U.S. Cl.
  CPC ............... *F16H 37/065* (2013.01); *F16H 3/72* (2013.01); *F16H 1/2818* (2013.01)

(58) Field of Classification Search
  None
  See application file for complete search history.

(56) References Cited

U.S. PATENT DOCUMENTS

| 3,529,493 | A | * | 9/1970 | Egli | F16H 3/44 475/116 |
| 3,861,484 | A | * | 1/1975 | Joslin | B60K 6/365 180/65.235 |
| 4,754,949 | A | * | 7/1988 | Fukamachi | F16K 31/043 251/129.03 |
| 4,973,295 | A | * | 11/1990 | Lee | F16H 3/72 475/153 |
| 7,597,641 | B2 | * | 10/2009 | Chen | F16H 47/04 475/78 |
| 8,433,477 | B2 | * | 4/2013 | Mukai | B62D 5/008 701/41 |
| 2011/0124460 | A1 | * | 5/2011 | Karlsson | B60L 15/20 475/150 |

* cited by examiner

*Primary Examiner* — Justin Holmes
(74) *Attorney, Agent, or Firm* — Kintner IP, LLC; Mary Frances Ludwig

(57) ABSTRACT

A continuously variable ratio transmission includes a planetary gear assembly with a sun gear fixed to a driving input shaft, and a driven output shaft connected to a planet carrier. A worm gear assembly includes a worm which is driven by a control motor and worm wheel which drives a ring gear of the planetary gear assembly at a continuously variable speed. The output shaft transmits power to a load while rotating in the same direction as the input shaft. In an embodiment, two worms are driven by the control motor. In another embodiment, the transmission is operable in reverse by only the control motor. In another embodiment, a control gear assembly drives the ring gear and includes parallel axis helical gears.

15 Claims, 6 Drawing Sheets

COUPLED WORM PLANETARY GEAR CONTINUOUSLY VARIABLE RATIO TRANSMISSION

CROSS REFERENCE TO RELATED APPLICATION

This application claims the filing benefit under 35 U.S.C. §119(e) of U.S. Provisional Application No. 62/125,263, filed 20 Jan. 2015, which is hereby incorporated by reference.

TECHNICAL FIELD

The present invention pertains generally to transportation, and more particularly to a continuously variable ratio transmission.

BACKGROUND OF THE INVENTION

Continuously variable ratio transmissions are well known in the art. Such transmissions are also referred to as continuously variable transmissions, CVTs, stepless variable transmissions, or infinitely variable transmissions. These transmissions have a gear ratio which may be continuously varied over some range, rather than shifted among several fixed ratios. Early CVTs included a rubber belt and pulley system, which was later upgraded to a steel belt for improved durability.

Other continuously variable transmissions use planetary gear sets, but large motors are used to control the rotational speed ratios. U.S. Pat. No. 6,761,658 describes an infinitely variable transmission which includes three planetary gear assemblies controlled by hydrostatic drives.

U.S. Pat. No. 4,973,295 describes a worm-planetary continuously variable transmission where the revolution of the planet gears is controlled by a worm gear assembly. In this transmission, the input and output shafts rotate in opposite directions. An additional gear assembly is required to reverse the direction of the output shaft rotation, decreasing the efficiency of this transmission.

U.S. Pat. No. 2,859,641 to Gleasman describes a worm gear assembly which is self-locking at gear ratios as low as 1.86:1. This type of assembly is commonly used in automobile differentials. Such differentials are referred to as 'torque sensing' or TORSEN (a registered trademark of JTEKT Corporation of Japan).

BRIEF SUMMARY OF THE INVENTION

The present invention is directed to a continuously variable ratio transmission which utilizes a single planetary gear assembly coupled to a worm gear assembly which controls the rotational speed ratio of the input and output shafts. The input and output shafts both rotate in the same direction, resulting in a higher efficiency transmission with fewer parts than other continuously variable transmissions. The worm gear assembly is self-locking and has a gear ratio of less than 3:1, allowing the rotational speed of the output shaft to be continuously controlled over a wide range.

In accordance with an embodiment, the transmission cooperates with an input drive which rotates an input shaft. The transmission has a planetary gear assembly including a sun gear, a planet carrier, and a ring gear. The sun gear is fixed to the input shaft and the planet carrier is connected to the output shaft. A control motor and the worm gear assembly drive a worm wheel and the ring gear at a continuously variable speed, whereby the rotational speed of the output shaft is continuously variable.

In accordance with another embodiment, the worm gear assembly has a gear ratio of between about 3:1 and about 1.4:1.

In accordance with another embodiment, the worm has a helix angle sufficient to prevent the worm wheel from back-driving the worm.

In accordance with another embodiment, the planetary gear assembly has a gear ratio of between about 3:1 and about 7:1.

In accordance with another embodiment, a plurality of worms drive said worm wheel.

In accordance with another embodiment, the transmission is operable in reverse by running the control motor in reverse. A one-way clutch is mounted to the input shaft, and the input drive does not need to run.

Other embodiments, in addition to the embodiments enumerated above, will become apparent from the following detailed description, taken in conjunction with the accompanying drawings, which illustrate, by way of example, the principles of the apparatus.

LIST OF DRAWING REFERENCE NUMERALS

Figure 1:
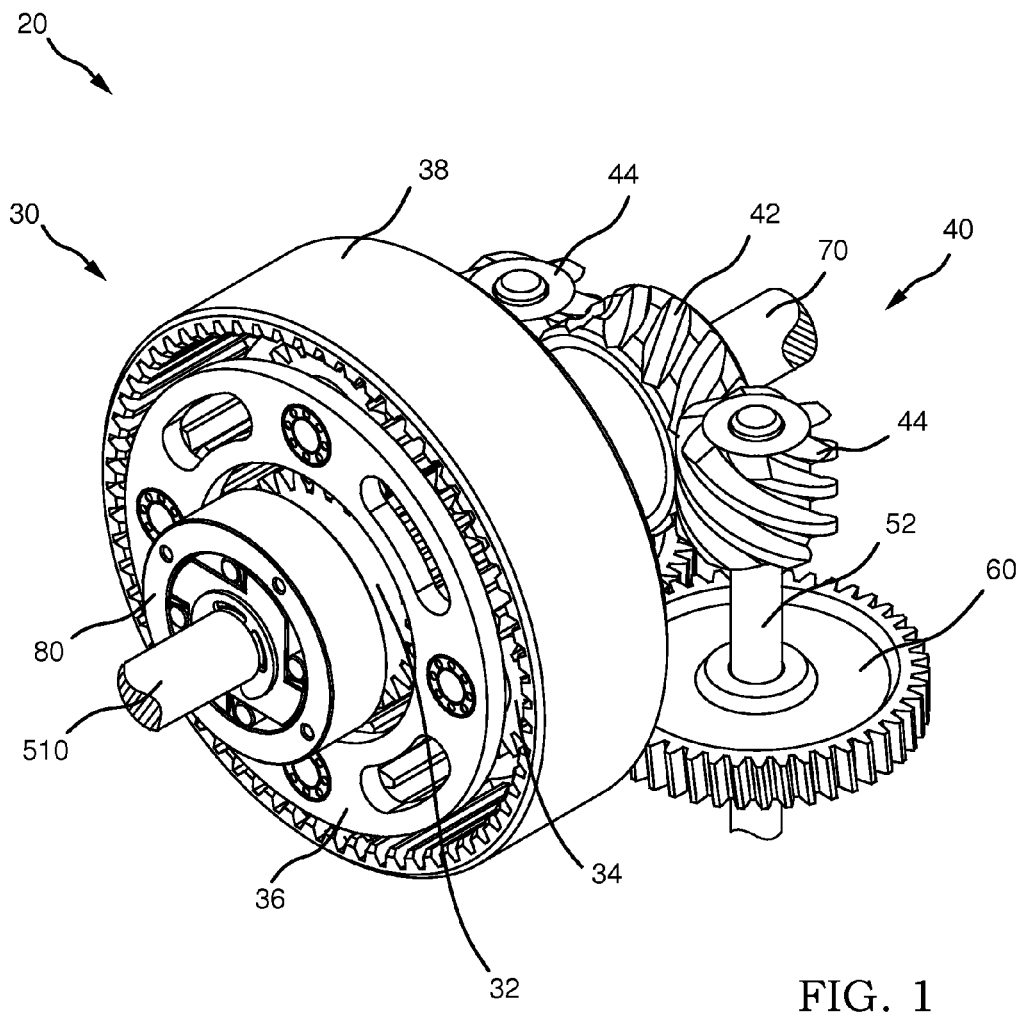
FIG. 1 is a front perspective view of a continuously variable ratio transmission.

20 transmission
30 planetary gear assembly
32 sun gear
34 planet gears
35 planet gear shafts
36 planet carrier
38 ring gear
40 worm gear assembly
42 worm wheel
44 worm
46 intermediate gear
50 control motor
52 worm shaft
60 spur gear
70 output shaft
72 output gear
80 one-way clutch
90 control gear assembly
92 driving helical gear
94 driven helical gear
96 idler gear
500 input drive
510 input shaft

DETAILED DESCRIPTION OF THE INVENTION

Referring initially to FIGS. 1-4, there are illustrated front perspective, front, back, and side elevation views, respectively, of a continuously variable ratio transmission generally designated as 20. Transmission 20 transfers power from an input shaft 510 to an output shaft 70. An input drive 500 (partially shown in FIG. 4), such as a vehicle engine, is connected to and rotates input shaft 510. Output shaft 70 is operatively coupled with a load, such as the wheels of a vehicle, to which shaft 70 transmits power.

Transmission 20 includes a planetary gear assembly 30 coupled to a worm gear assembly 40 which is used to continuously vary the ratio of the rotational speeds of input shaft 510 to output shaft 70. Worm gear assembly 40 includes a worm wheel 42 and at least one worm 44, also referred to as a transfer gear or worm screw. Worm 44 is fixed to a worm shaft 52. Two worms 44 are shown in the embodiment of FIGS. 1-7. Each worm 44 is tangentially oriented to and meshingly engaged with worm wheel 42. The term "meshingly engaged" means that the teeth of the gears are engaged with one another.

Figure 3:
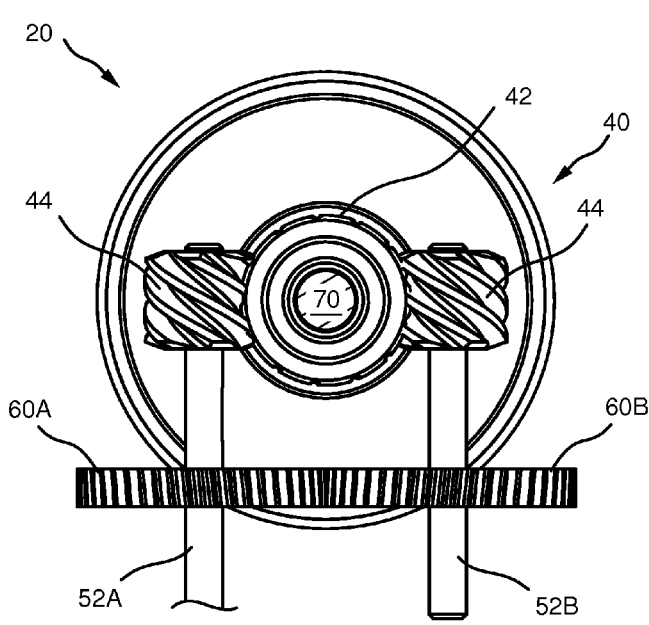
FIG. 3 is a back elevation view of the transmission.
Figure 4:
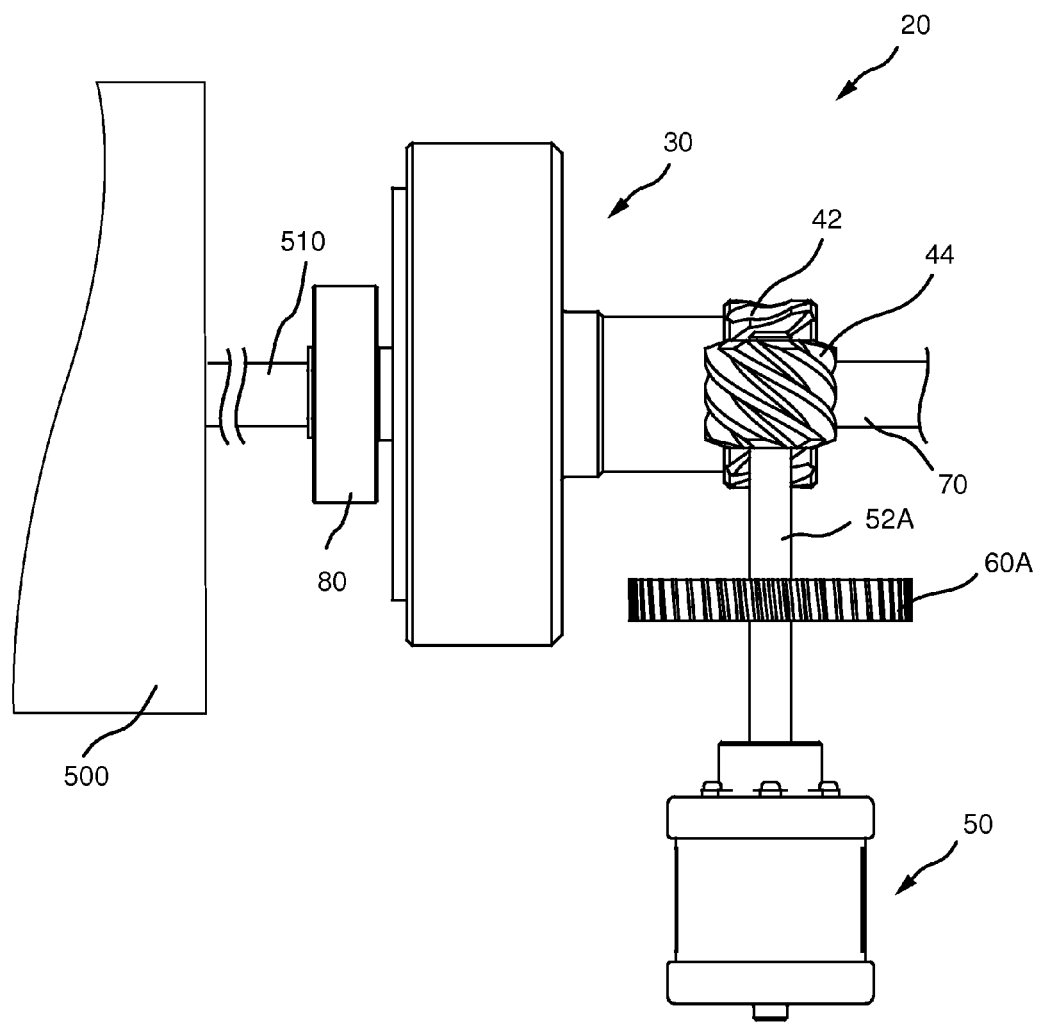
FIG. 4 is a side elevation view of the transmission.

A control motor 50 is connected to and rotates one of worm shafts 52 at a continuously variable speed. Control motor 50 may be an electric or hydraulic motor capable of continuously variable rotational speed. Control motor 50 is removed from FIGS. 1 & 3 for simplicity. Referring to FIGS. 3 & 4, a spur gear 60A is mounted on and rotates with worm shaft 52A which is driven by control motor 50. Spur gear 60B is mounted on adjacent worm shaft 52B, and meshingly engages with spur gear 60A with a 1:1 gear ratio. In this manner, control motor 50 drives multiple worms 44 and the load of rotating worm wheel 42 is split between the multiple worms.

Figure 2:
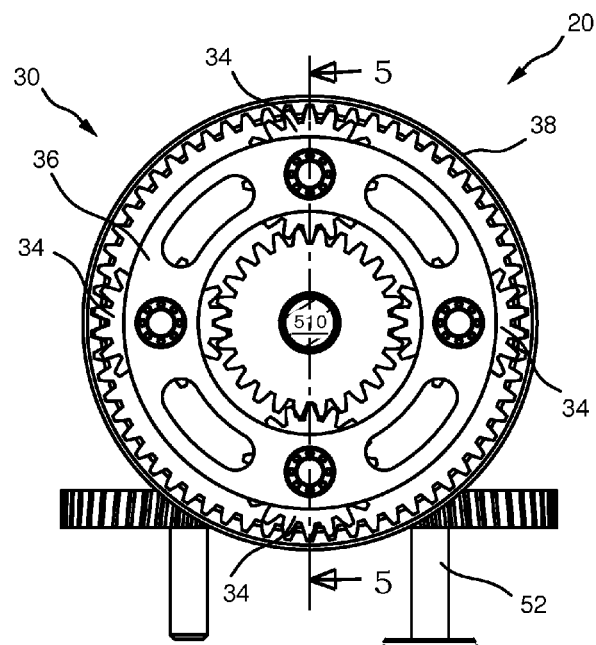
FIG. 2 is a front elevation view of the transmission.
Figure 5:
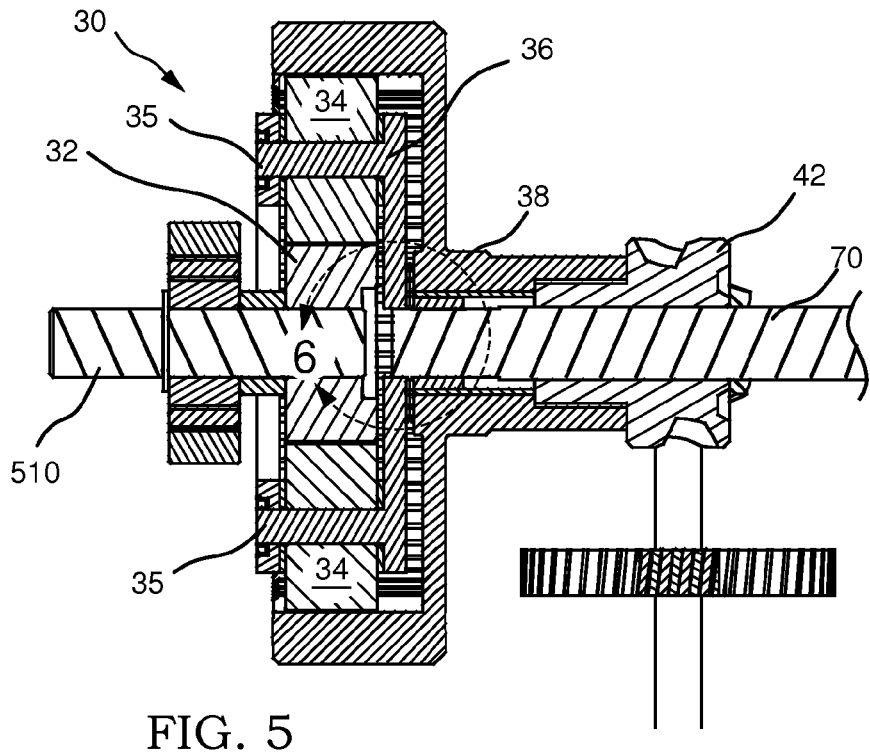
FIG. 5 is a cross sectional view along line 5-5 of FIG. 2.
Figure 6:
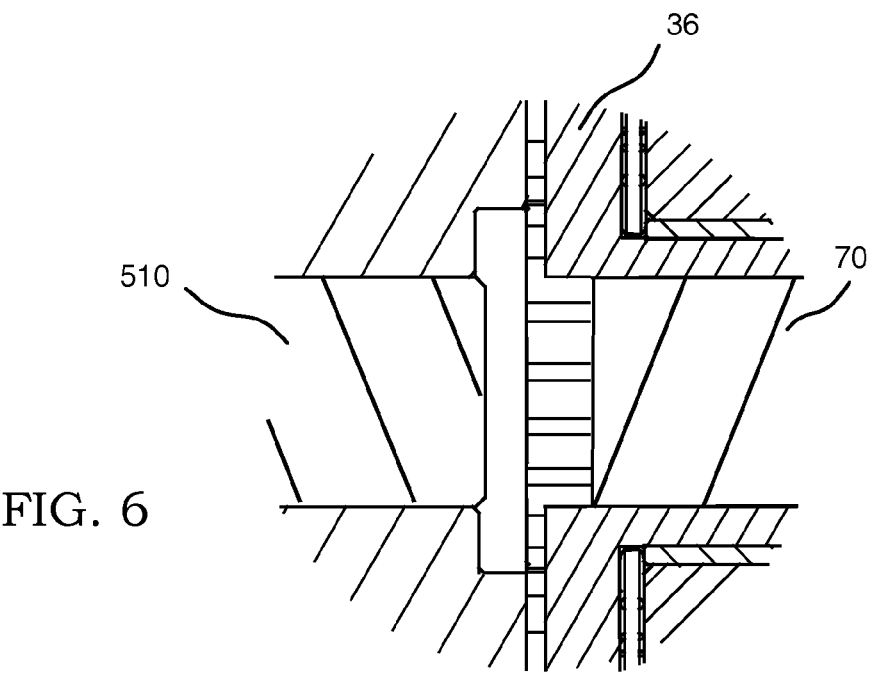
FIG. 6 is an enlarged view of area 6 of FIG. 5.
Figure 7:
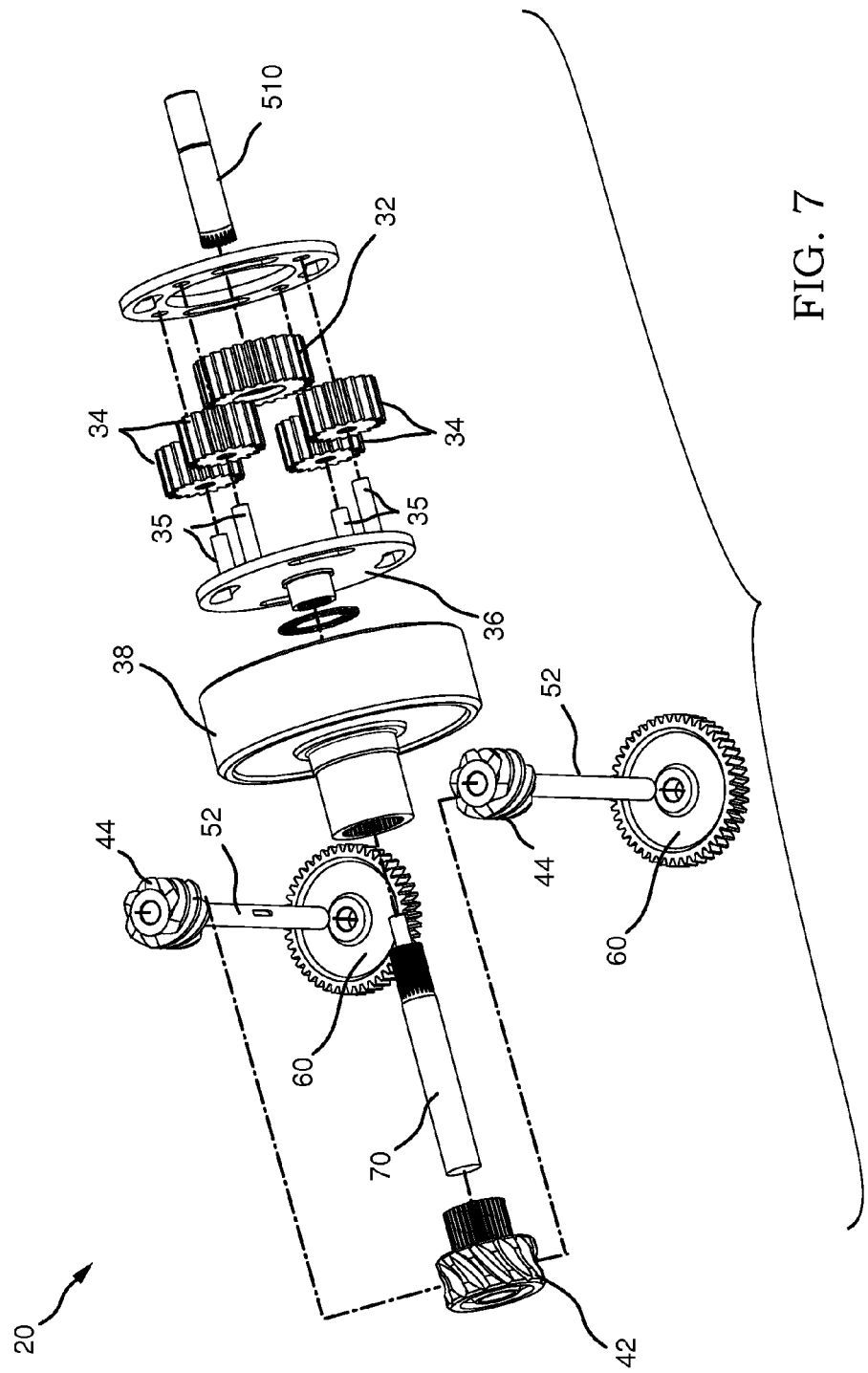
FIG. 7 is a reduced exploded rear perspective view of the transmission.

FIG. 5 is a cross sectional view of transmission 20 along line 5-5 of FIG. 2, and FIG. 6 is an enlarged view of area 6 of FIG. 5. FIG. 7 is a reduced exploded rear perspective view of transmission 20. Input drive 500 is not shown in FIGS. 5-7 for simplicity. Planetary gear assembly 30 includes a central sun gear 32 fixed to input shaft 510 in a manner which does not allow the sun gear to rotate relative to the input shaft (such as a keyway and key, complementary splines, or other arrangement well known in the art).

A plurality of planet gears 34 are rotatably supported by planet gear shafts 35 on a planet carrier 36. 'Rotatably supported' means that planet gears 34 may freely rotate about their supporting shafts 35. Planet gears 34 are held in place on shafts 35 by shaft collars or the like (removed from FIG. 7 for clarity). Planet gears 34 surround, meshingly engaged with, and revolve about sun gear 32. Four planet gears 34 are shown in the present embodiment, but fewer or more planet gears may be used. Planet carrier 36 is connected to the end of output shaft 70 opposite the load, such as by output shaft 70 having a splined end and planet carrier 36 having a corresponding splined coupling hub as shown in FIG. 7. This embodiment is exemplary, and other attachment methods may be used as are well known in the art.

A ring gear 38, having internal teeth or teeth around its inner diameter, encircles and meshingly engages with planet gears 34. Ring gear 38 is connected to worm wheel 42 of worm assembly 40 so that when worm wheel 42 rotates ring gear 38 also rotates. In the shown embodiment, worm wheel 42 is connected to ring gear 38 by a splined shaft and coupling hub combination, but other attachment methods may be used.

In a preferred embodiment, planetary gear assembly 30 has a gear ratio of 3:1. When control motor 50 is not powered, worm wheel 42 does not rotate and ring gear 38 is stationary. In this configuration the ratio of rotational speeds of input shaft 510 and output shaft 70 is controlled only by the planetary gear ratio, and is therefore 3:1 in this embodiment. In other embodiments, planetary gear assembly 30 has a gear ratio of between about 3:1 and about 7:1.

When control motor 50 is powered, the rotational motion of control motor 50 is transferred from worms 44 to worm wheel 42 and to the connected ring gear 38. Ring gear 38 is driven by worm wheel 42 in the direction of motion of sun gear 32, thereby increasing the rotational speed of planet carrier 36 and reducing the shaft speed ratio. At a 1:1 speed ratio, planetary gears 34 do not rotate on their axes, and the entire planetary gear assembly 30 rotates at the speed of the input shaft. At this ratio there is very little energy lost to mechanical components, and operation of transmission 20 is very efficient. Thus by continuously varying the speed of control motor 50, the rotational speed of output shaft 70 is continuously variable from 1:1 to the gear ratio of planetary gear assembly 30.

An advantage of having output shaft 70 connected to planet carrier 36 is that the input and output shafts rotate in the same direction. In an exemplary embodiment, input shaft 510 provides rotary motion in a clockwise direction. Sun gear 32 is fixed to the input shaft and therefore also moves clockwise, driving all of the planet gears 34 to rotate in a counterclockwise direction while revolving about sun gear 32 in a clockwise direction. Therefore planet carrier 36 and output shaft 70 rotate in a clockwise direction, like input shaft 510.

It is desirable that worm gear assembly 40 have a low gear ratio so that the corresponding output speed requirement (rpm) of control motor 50 is as low as possible. In an embodiment, worm wheel 42 has thirteen teeth and worm 44 has seven teeth, resulting in a 1.86:1 gear ratio for worm gear assembly 40. In other embodiments, worm gear assembly 40 has a gear ratio of between about 3:1 and about 1.4:1.

It is also desirable that worms 44 cannot be driven by worm wheel 42. The worm wheel driving the worm is referred to as back-driving, and the inability to back-drive is referred to as self-locking. The ability for a worm wheel to back-drive a worm is a function of the lead angle of the worm, which increases as the number of worm threads (or teeth) increases. For a worm gear of typical construction, self-locking is impossible at the desired worm assembly gear ratios, due to the large number of teeth on the worm and resulting high lead angle. In general, a standard worm gear assembly may be back-driven at lead angles approaching 12-15 degrees.

With a helical worm design, the ability to back-drive is a function of the helix angle, defined as the angle between the helical tooth and a transverse cross-section of the gear. Self-locking is possible at helix angles approaching 45 degrees. In the present invention, worms 44 have teeth oriented at a helix angle and the helix angle is sufficient to prevent worm wheel 42 from back-driving worms 44 at a worm gear assembly gear ratio of 3:1 and lower. A worm assembly gear ratio of less than 1.4:1 is desirable for the present transmission, however, further advances in gear manufacture are required to enable self-locking at such low ratios.

Figure 8:
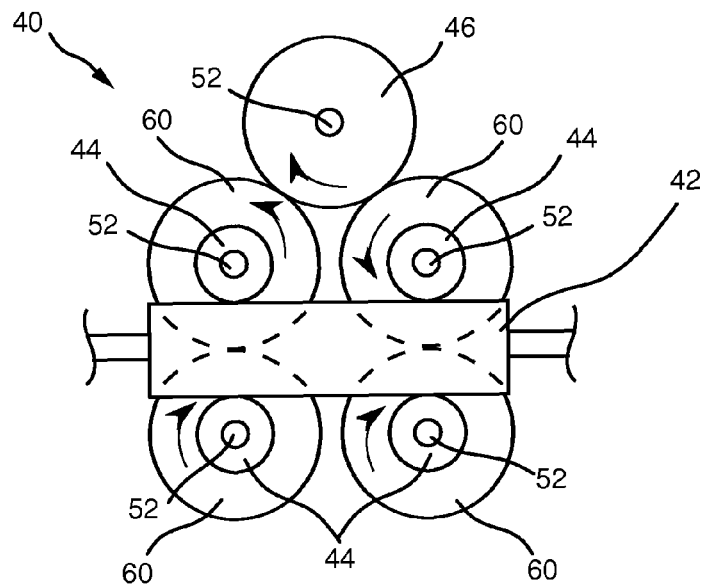
FIG. 8 is a reduced schematic plan view of an embodiment of a worm gear assembly.

FIG. 8 is a reduced schematic plan view of another embodiment of worm gear assembly 40. In the shown embodiment, worm wheel 42 is longer than in the embodiment of FIGS. 1-7, and two longitudinally adjacent pairs of worms 44 are present (for a total of four worms). An intermediate gear 46 is driven by control motor 50 (not shown) transferring power to all four spur gears 60 and worms 44. Alternatively, control motor 50 powers one of spur gears 60 and one of worms 44 (as shown in FIG. 2). Intermediate gear 46 is an idler gear which causes the longitudinally adjacent pair of worms 44 to rotate in the direction of the driven pair. The directions of rotation, indicated by arrows in FIG. 8, are exemplary. These embodiments would increase the overall length of transmission 20.

Figure 9:
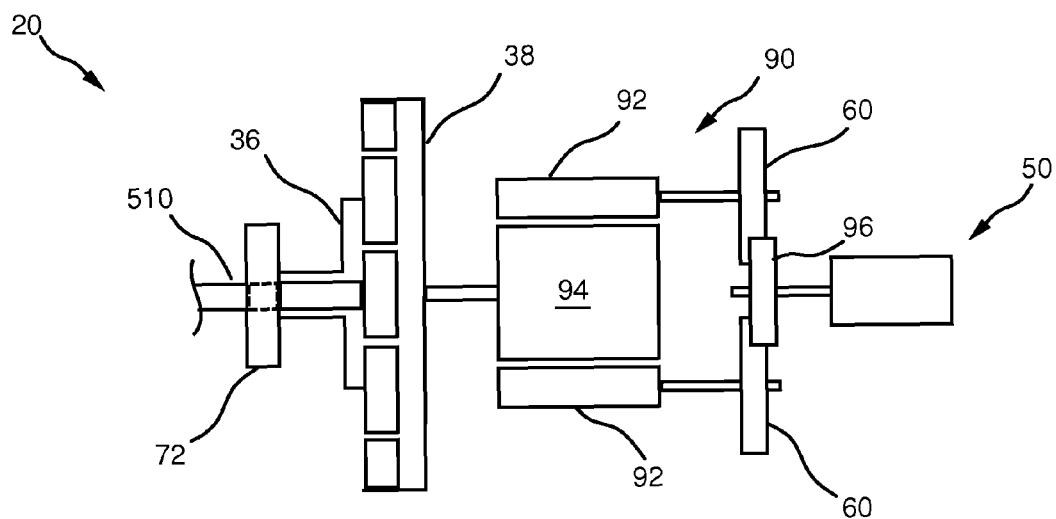
FIG. 9 is a reduced schematic side elevation view of another embodiment of the transmission.

FIG. 9 is a reduced schematic side elevation view of another embodiment of transmission 20. A control gear assembly 90 includes a driving helical gear 92 which is coupled to control motor 50. A driven helical gear 94 is oriented parallel to and meshingly engages with driving helical gear 92. This parallel axis helical gear arrangement is commonly used in automobile transmissions and was patented by DuPras (U.S. Pat. No. 2,000,223). Control gear assembly 90 is self-locking at gear ratios as low as 1.4:1. This embodiment enables the use of a lower horsepower control motor.

An output gear 72 is connected to planet carrier 36. Input shaft 510 (shown partially hidden) passes through output gear 72, however they are not connected and rotate independently. Output gear 72 transmits power to output shaft 70 (not shown) by means of at least one additional connecting gear. In a preferred embodiment, the input shaft and the output shaft rotate in the same direction. To do so an intermediate or idler gear 96 operatively connects control motor 50 with spur gear 60. In another embodiment more than one driving helical gear 92 is used in parallel to driven helical gear 94.

In an embodiment, transmission 20 is capable of driving output shaft 70 in reverse when input drive 500 is not running. A one-way clutch 80, such as a sprag clutch, is mounted to input shaft 510 (as shown in FIGS. 1 & 4). When control motor 50 is operated in reverse, output shaft 70 rotates in reverse, one-way clutch 80 engages, and input shaft 510 does not rotate.

The embodiments of the continuously variable ratio transmission described herein are exemplary and numerous modifications, combinations, variations, and rearrangements can be readily envisioned to achieve an equivalent result, all of which are intended to be embraced within the scope of the appended claims. Further, nothing in the above-provided discussions of the transmission should be construed as limiting the invention to a particular embodiment or combination of embodiments. The scope of the invention is defined by the appended claims.

I claim:

1. A continuously variable ratio transmission, cooperating with an input drive which rotates an input shaft, the transmission comprising:
   only a single planetary gear assembly including a sun gear, a plurality of planet gears rotatably supported on a planet carrier, said planet gears revolvingly surrounding and meshingly engaged with said sun gear, and a ring gear encircling and meshingly engaged with said planet gears;
   said sun gear being fixed to the input shaft;
   an output shaft fixed to said planet carrier, said output shaft rotating in the same direction as the input shaft and transmitting power to a load operatively coupled therewith;
   a worm gear assembly including a worm wheel connected to said ring gear so that rotational motion of said worm wheel drives said ring gear, a worm shaft, and a worm tangentially oriented to and meshingly engaged with said worm wheel and fixed to said worm shaft; and,
   a control motor which rotates said worm shaft at a continuously variable speed, whereby rotational motion is transferred from said worm to said worm wheel and said ring gear, and the rotational speed of said planet carrier and said output shaft is continuously variable.

2. The transmission according to claim 1, further including:
   said worm gear assembly having a gear ratio of between about 3:1 and about 1.4:1.

3. The transmission according to claim 2, further including:
   said worm having teeth oriented at a helix angle; and,
   said helix angle being sufficient to prevent said worm wheel from back-driving said worm.

4. The transmission according to claim 1, further including:
   said planetary gear assembly having a gear ratio of between about 3:1 and about 7:1.

5. The transmission according to claim 1, wherein:
   said control motor is an electric motor or a hydraulic motor.

6. The transmission according to claim 1, further including:
   a plurality of worms tangentially oriented to and meshingly engaged with said worm wheel;
   a plurality of worm shafts;
   each said worm fixed to one of said worm shafts; and,
   a plurality of spur gears each meshingly engaged with at least one other of said spur gears and each fixed to one of said worm shafts, so that when said control motor rotates one of said worm shafts rotational motion is transferred by said spur gears to the other said worm shafts.

7. The transmission according to claim 6, having:
   only two said worms positioned on opposite sides of said worm wheel; and,
   only two said worm shafts.

8. The transmission according to claim 1, further including:
   a one-way clutch mounted to the input shaft so that when said control motor is operated in reverse said output shaft rotates in reverse, said one-way clutch engages, and the input shaft does not rotate.

9. The transmission according to claim 1, further including:
   said worm having teeth oriented at a helix angle;
   said helix angle being sufficient to prevent said worm wheel from back-driving said worm;
   said planetary gear assembly having a gear ratio of between about 3:1 and about 7:1;
   said control motor being an electric motor or a hydraulic motor;
   only two said worms tangentially oriented to, positioned on opposite sides of, and meshingly engaged with said worm wheel;
   only two said worm shafts;
   each said worm fixed to one of said worm shafts;
   a plurality of spur gears each meshingly engaged with at least one other of said spur gears and each fixed to one of said worm shafts, so that when said control motor rotates one of said worm shafts rotational motion is transferred by said spur gears to the other said worm shafts; and,
   a one-way clutch mounted to the input shaft so that when said control motor is operated in reverse said output shaft rotates in reverse, said one-way clutch engages, and the input shaft does not rotate.

10. A continuously variable ratio transmission, cooperating with an input drive which rotates an input shaft, the transmission comprising:
   only a single planetary gear assembly including a sun gear, a plurality of planet gears rotatably supported on a planet carrier, said planet gears revolvingly surrounding and meshingly engaged with said sun gear, and a ring gear encircling and meshingly engaged with said planet gears;
   said sun gear being fixed to the input shaft;

an output gear fixed to said planet carrier, said output gear transmitting power to an output shaft operatively coupled therewith;

said output shaft rotating in the same direction as the input shaft;

a control gear assembly including a driving helical gear coupled to a control motor and a driven helical gear fixed to said ring gear so that rotational motion of said driven helical gear drives said ring gear, said driven helical gear oriented parallel to and meshingly engaged with said driving helical gear; and, said control motor rotating said driving helical gear at a continuously variable speed, whereby rotational motion is transferred from said driving helical gear to said driven helical gear and said ring gear, and the rotational speed of said planet carrier and said output gear is continuously variable.

11. The transmission according to claim 10, further including:

said control gear assembly having a gear ratio of between about 3:1 and about 1.4:1.

12. The transmission according to claim 11, further including:

said driving helical gear having teeth oriented at a helix angle; and, said helix angle being sufficient to prevent said driven helical gear from back-driving said driving helical gear.

13. The transmission according to claim 10, further including:

said planetary gear assembly having a gear ratio of between about 3:1 and about 7:1.

14. The transmission according to claim 10, wherein:

said control motor is an electric motor or a hydraulic motor.

15. The transmission according to claim 10, further including:

a one-way clutch mounted to the input shaft so that when said control motor is operated in reverse said output shaft rotates in reverse, said one-way clutch engages, and the input shaft does not rotate.

\* \* \* \* \*